United States Patent
Akram et al.

(10) Patent No.: US 7,580,797 B2
(45) Date of Patent: Aug. 25, 2009

(54) SUBSURFACE LAYER AND RESERVOIR PARAMETER MEASUREMENTS

(75) Inventors: Agha Hassan Akram, Pau (FR); Lawrence Camilleri, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 16 days.

(21) Appl. No.: 11/830,899

(22) Filed: Jul. 31, 2007

(65) Prior Publication Data
US 2009/0037113 A1 Feb. 5, 2009

(51) Int. Cl.
*G01N 15/08* (2006.01)
(52) U.S. Cl. .............................. 702/12; 702/14; 702/50; 166/227; 166/278; 340/853.1; 367/81; 367/86; 507/100
(58) Field of Classification Search ................... 702/12, 702/14, 50; 166/227, 243, 278; 340/853.1, 340/854.5; 367/81, 86; 507/100
See application file for complete search history.

(56) References Cited

U.S. PATENT DOCUMENTS

| | | | |
|---|---|---|---|
| 4,597,290 A * | 7/1986 | Bourdet et al. ........... | 73/152.37 |
| 4,873,648 A | 10/1989 | Mouser et al. | |
| 5,287,752 A | 2/1994 | Den Boer | |
| 5,535,632 A | 7/1996 | Kolpak | |
| 5,625,293 A | 4/1997 | Marrelli et al. | |
| 5,691,712 A * | 11/1997 | Meek et al. .............. | 340/853.3 |
| 5,736,637 A | 4/1998 | Evans et al. | |
| 5,969,638 A * | 10/1999 | Chin ........................ | 340/855.3 |
| 6,216,532 B1 | 4/2001 | Stephenson et al. | |
| 6,581,685 B2 * | 6/2003 | Burgess et al. ......... | 166/250.02 |
| 6,588,266 B2 | 7/2003 | Tubel et al. | |
| 6,629,564 B1 | 10/2003 | Ramakrishnan et al. | |
| 6,782,736 B1 | 8/2004 | Hammer | |
| 6,810,719 B2 | 11/2004 | Dutton et al. | |
| 6,860,325 B2 | 3/2005 | Ramakrishnan et al. | |
| 6,899,176 B2 * | 5/2005 | Hailey et al. ................. | 166/278 |
| 7,013,715 B2 | 3/2006 | Dutton et al. | |
| 7,040,390 B2 | 5/2006 | Tubel et al. | |
| 7,055,604 B2 | 6/2006 | Jee et al. | |
| 7,108,069 B2 | 9/2006 | Killie et al. | |
| 7,114,557 B2 | 10/2006 | Cudmore et al. | |
| 7,114,572 B2 | 10/2006 | Batho et al. | |

(Continued)

FOREIGN PATENT DOCUMENTS

GB  2427224 A  12/2006

(Continued)

*Primary Examiner*—Edward Raymond
*Assistant Examiner*—Elias Desta
(74) *Attorney, Agent, or Firm*—Van Someren, PC; Daryl R. Wright; James L. Kurka (57) ABSTRACT

Method and system for determining a characteristic of a subsurface formation traversed by a wellbore. A fluid flow rate in the wellbore is established, the flow being associated with fluid movement in one or more layers in the formation. Fluid data is generated from the fluid flow. The fluid flow rate in the wellbore is selectively altered, and fluid data is re-generated pertaining to the altered flow rates. The fluid data is processed to determine desired reservoir parameters and/or characteristics of an identified stratum in the formation. A method identifies inflexion points on a single phase oil only curve plot using the fluid data to determine layer characteristics and flow stability.

20 Claims, 10 Drawing Sheets

U.S. PATENT DOCUMENTS

| | | |
|---|---|---|
| 7,201,221 B2 | 4/2007 | Tubel et al. |
| 7,215,416 B2 | 5/2007 | Yamate et al. |
| 7,240,730 B2 * | 7/2007 | Williams et al. ....... 166/250.03 |
| 2004/0049346 A1 | 3/2004 | Despax et al. |
| 2005/0268702 A1 | 12/2005 | Johansen |
| 2006/0129321 A1 | 6/2006 | Despax |
| 2006/0196660 A1 | 9/2006 | Patel |
| 2006/0215971 A1 | 9/2006 | Ramos |
| 2007/0001028 A1 | 1/2007 | Gysling |
| 2007/0055464 A1 | 3/2007 | Gysling |

FOREIGN PATENT DOCUMENTS

| | | |
|---|---|---|
| WO | 2005064297 A1 | 7/2005 |

* cited by examiner

SUBSURFACE LAYER AND RESERVOIR PARAMETER MEASUREMENTS

BACKGROUND

1. Technical Field

The present invention relates generally to the field of subsurface fluid production and reservoir monitoring.

2. Description of Related Art

In the production phase of oil wells, production is often commingled from several layers or stratum in the formation, these layers may or may not be in pressure or flow communication. In most oil wells, water enters the well and is recovered together with the oil. Furthermore, as the well ages the amount or cut of recovered water generally increases. The ratio of water produced compared to the volume of total liquids produced is referred to as the watercut. Wells are typically produced up to watercuts of 95% and even 98% and then abandoned unless the watercut can be reduced. The size of the water cut produced by the well has a substantial effect on the economics of well operations; it also can be a measure of the recovery factor in water flooded reservoirs. Conventional metering devices are employed to measure the water component or cut of a specific product as it flows through a pipeline. These meters measure the differential flow characteristics of water and other components of the liquid to determine the percentage of water. U.S. Pat. Nos. 7,108,069, 6,782,736, 5,625,293, 5,287,752, 4,873,648 and U.S. Patent Publication Nos. 20070055464 and 20070001028 describe watercut measurement techniques.

During production, it is desirable to measure and monitor the inflow properties of each stratum separately. The inflow properties include parameters such as the total liquid flow rate, watercut, gas-to-oil ratio, and static reservoir pressure. Measurements of these properties have traditionally been performed using production logging tools (PLT) disposed downhole on a cable (e.g., wireline, slickline). However, in many wells this is not possible for a variety of reasons, such as: completion access to the formation limits the running of PLTs on wireline (e.g., highly deviated wells, deposits on the tubing, high flow rate wells, etc.); casing size and apparatus disposed within the casing prohibit running PLTs as there is insufficient space for by-pass tubing; logistics and cost of wireline/slickline intervention prohibits running PLTs. This is the case with sub-sea wells, and can also be an issue on unmanned offshore wellhead jackets. Various techniques have been employed in the oilfield industry to detect and measure the commingled components in well fluids. U.S. Pat. Nos. 7,013,715, 6,810,719, 6,216,532, 6,629,564, 6,860,325, 5,535,632, 5,736,637 and U.S. Patent Publication Nos. 20050268702 and 20040244501 describe multiphase flow measurement techniques.

One approach for measuring fluid flow within the well is with a distributed temperature sensing (DTS) system. DTS systems use fiber-optic technology to accurately determine the position and variation of temperature changes over thousands of individual points along a fiber. The optical fiber acts as both the sensing element and the data-transmission medium. Fiber-optic DTS systems use a laser to send pulses of light through a directional optical coupler and down the fiber. As each laser pulse is sent down the fiber, light is scattered by several mechanisms, including fiber density and composition fluctuations, as well as molecules in the fiber. A portion of this scattered light stays within the fiber and is guided back toward the source, where it is split by the directional coupler to a receiver and analyzed to measure the temperature along the fiber.

With a DTS sensor disposed in the wellbore, temperature is continuously collected and transmitted to the surface using fiber optic technology. At the surface, the data can be transmitted to multiple remote locations as desired with satellite, Internet and cable communications. U.S. Pat. Nos. 7,201,221, 7,040,390, 7,215,416, 7,055,604, 6,588,266 and U.S. Patent Publication Nos. 20060215971 and 20060196660 describe fiber optic-based sensors. DTS sensors are implemented for downhole use by providers such as SENSA™, a Schlumberger Company (information available at www.sensa.org).

In producing petroleum and other useful fluids from production wells, it is generally known to add energy to the fluid column in the wellbore with the objective of initiating and improving production from the well. Such systems are commonly referred to as Artificial-lift (AL) systems. Conventional AL systems use a range of operating principles, including rod pumping, gas lift and electrical submersible pumps (ESP). U.S. Pat. Nos. 7,114,557 and 7,114,572 describe conventional ESP apparatus. ESPs are often used for raising the fluids collected in a well. Typically, production fluids enter a wellbore via perforations made in a well casing adjacent a production formation i.e. a layer/stratum. Fluids contained in the formation collect in the wellbore and may be raised by the AL system to a collection point above the earth's surface. The AL systems can also be used to move the fluid from one zone to another.

A need remains for improved techniques and systems to measure and monitor inflow properties and reservoir parameters, particularly in the production phase of oil wells.

SUMMARY

One aspect of the invention provides a method for determining a characteristic of a subsurface formation traversed by a wellbore. The method includes establishing a rate of fluid flow in the wellbore, the flow associated with fluid movement in one or more stratum in the formation; generating fluid data from the fluid flow; altering the rate of fluid flow in the wellbore; generating fluid data associated with the altered fluid flow rate; and processing the fluid data to determine at least one characteristic of an identified stratum in the formation.

Another aspect of the invention provides a system to determine a characteristic of a subsurface formation traversed by a wellbore. The system includes a sensor disposed in the wellbore to measure a temperature parameter to establish a rate of fluid flow in the wellbore, the flow being associated with fluid movement in one or more stratum in the formation; a sensor to measure a parameter of the fluid flow through the wellbore to generate fluid data; an artificial lift system disposed in the wellbore to alter the rate of fluid flow in the wellbore; and a processor to process the generated fluid data to determine at least one characteristic of an identified stratum in the formation.

Another aspect of the invention provides a method for determining a characteristic of a subsurface formation traversed by a wellbore. The method includes establishing a rate of fluid flow in the wellbore, the flow being associated with fluid movement in one or more stratum in the formation; generating fluid data from the fluid flow; altering the rate of fluid flow in the wellbore; identifying an inflexion point on a plot using the fluid data; and processing the fluid data using the identified inflexion point to determine at least one characteristic of an identified stratum in the formation.

BRIEF DESCRIPTION OF THE DRAWINGS

Other aspects and advantages of the invention will become apparent upon reading the following detailed description and upon reference to the drawings in which like elements have been given like numerals and wherein.

DETAILED DESCRIPTION

Figure 1:
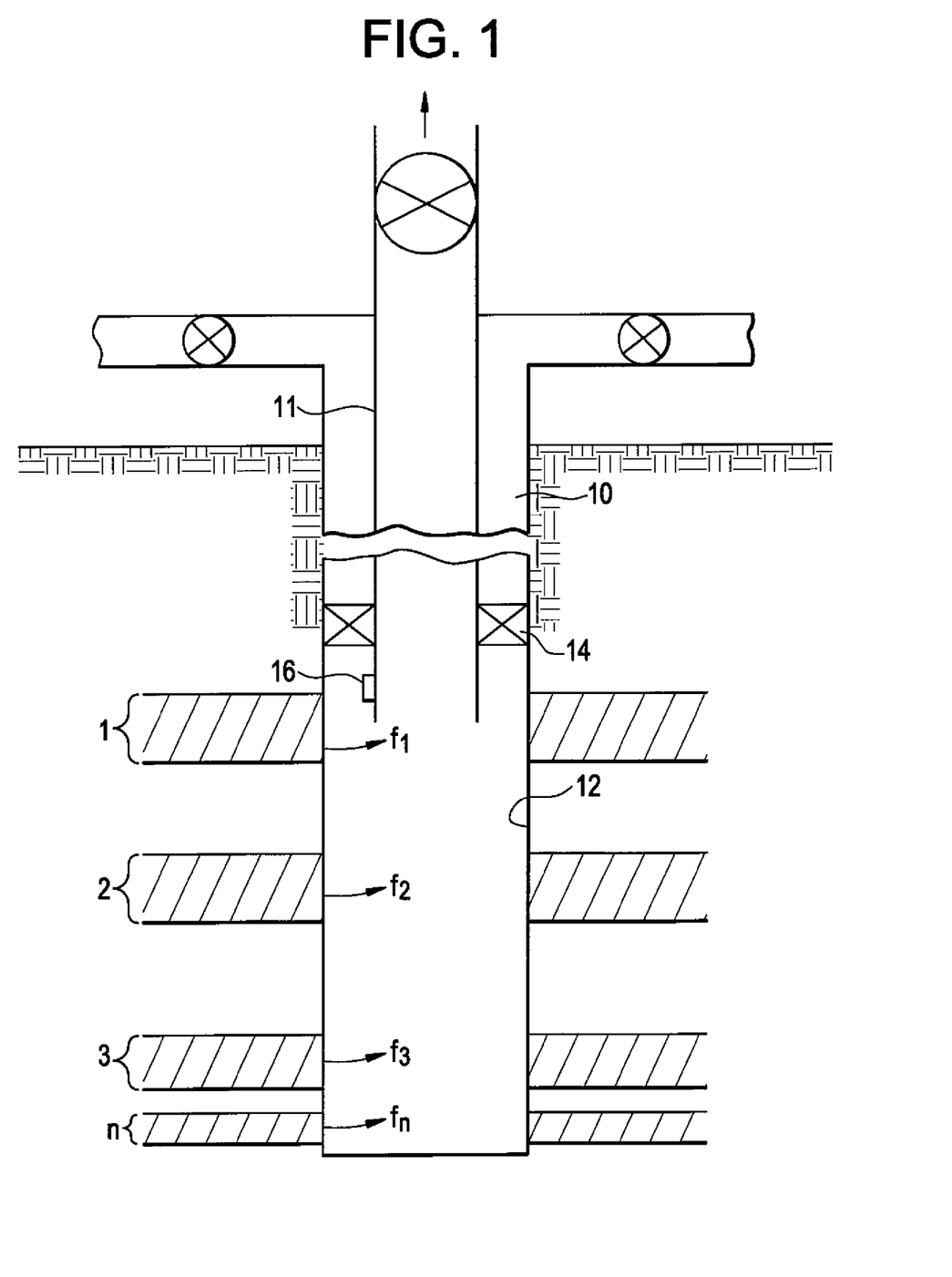
FIG. 1 is a schematic vertical cross-section of an oil well drilled in a multilayer formation into which a production string has been lowered.

FIG. 1 shows an oil well 10 drilled in a formation containing several oil-bearing strata or layers 1, 2, 3 . . . n. When the well is placed in production, it delivers a total oil flow to the surface through its production string 11. The annular space between the casing 12 and the production string 11 is often sealed off by a packer 14 and a sub-surface safety valve (not shown). Aspects of the invention may be implemented with or without a packer system. The partial flowrates $f_1$ to $f_n$ of layers 1 through n make up the total commingled flowrate. Pressure measurements are made using a pressure gauge (e.g., as described in U.S. Patent Publication No. 20070032957 to Popilian et al.) which can be installed at the well-head or at a downhole location as desired (as represented at 16), ideally both wellhead and downhole pressure are measured synchronously. Measurements of the pressure in the well as a function of time may be obtained in this way. The pressure measurements can be transmitted to the surface (e.g., via electrical cable) or recorded in the well using a recorder as known in the art. FIG. 1 shows but one type of sand face completion encountered within the industry. The present invention is not to be limited to any specific type of hardware configuration deployment to produce the layers.

By novel application of conventional oilfield instruments and technology, the present invention allows one to measure the inflow properties of the separate layers 1-n, along with other formation/reservoir parameters.

Figure 2:
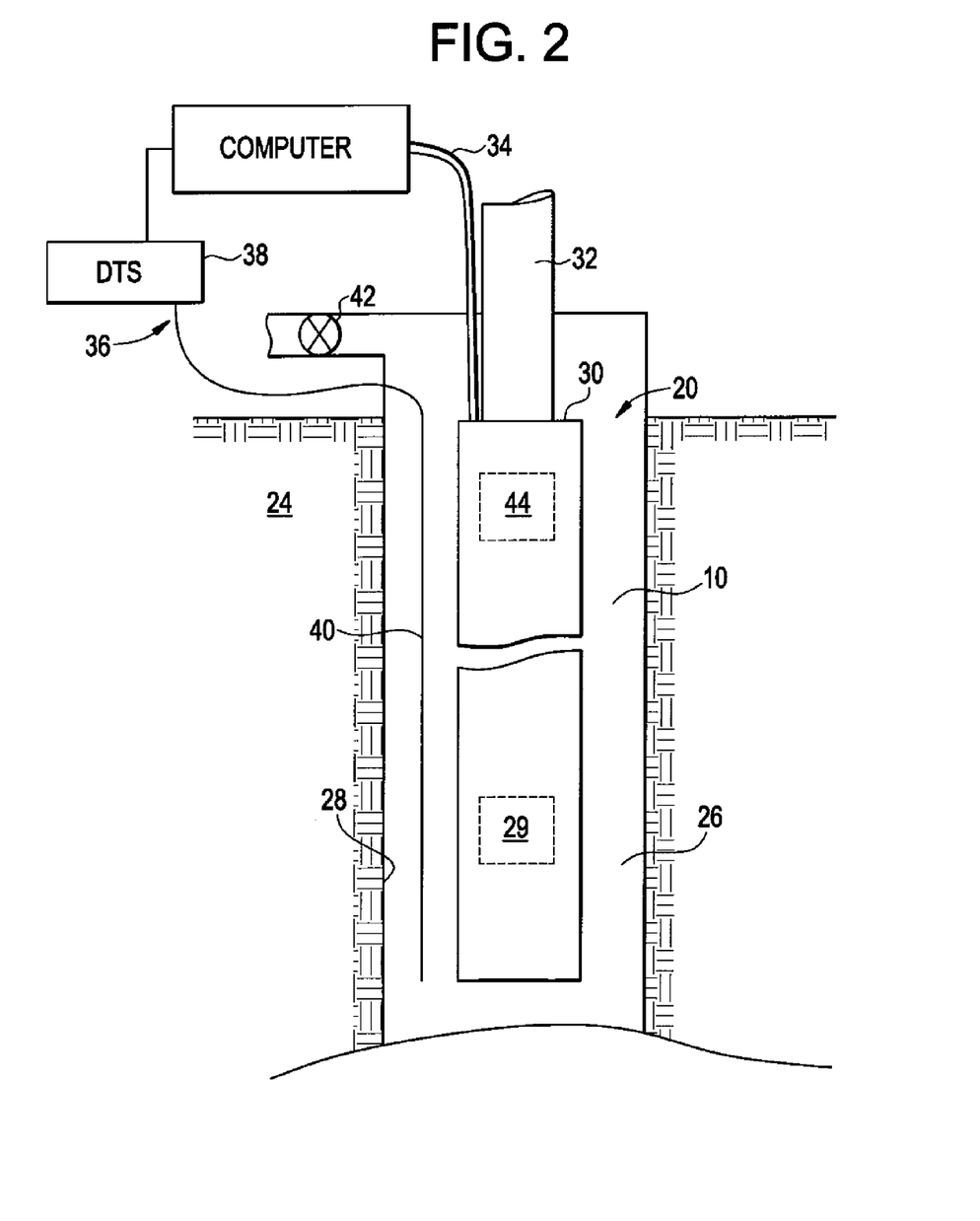
FIG. 2 is a schematic vertical cross-section of an oil well drilled in a multilayer formation, similar to the well of FIG. 1, into which a measurement system has been deployed in accordance with aspects of the invention.

FIG. 2 shows an aspect of the invention. An AL system 20, such as an electric submersible pumping (ESP) system (e.g., as described in U.S. Pat. No. 6,863,124, assigned to the present assignee and incorporated herein in its entirety by reference) is deployed in a well 10 within a geological formation 24 containing desirable production fluids. The wellbore 26 has been drilled and lined with casing 28. The AL system 20 is deployed within the wellbore 26 to a desired location to energize/pump the wellbore fluids. The AL system 20 may comprise a variety of components, as known in the art, depending on the particular application or environment in which it is used. In one aspect, the AL system 20 includes a pump intake through which wellbore fluids are drawn into a submersible pump. The AL system 20 is connected to a deployment system 30 for disposal within the well 10. The deployment system 30 may comprise any conventional conveyance means, such as cable, coil tubing, or production tubing. In the illustrated embodiment, the deployment system 30 comprises production tubing 32 through which the wellbore fluids may be pumped to another zone or to the surface. A cable 34 is disposed along, or within, the deployment system 30 and routed to the AL apparatus housing to provide power/signal communication.

Aspects of the invention can be implemented with other types of AL devices besides ESP systems. The desired functionality is that the AL device(s) can be configured to vary well flow rates over a relatively wide range of the commingled IPR curve. For example, another common form of AL that can be used to implement the invention is gas lift, provided the pressure enables fluid contribution from the desired layers.

The aspect shown in FIG. 2 also includes a distributed temperature sensing (DTS) system 36 (e.g., as described in U.S. Patent Application No. 20060115204 to Marsh et al., assigned to the present assignee and incorporated herein in its entirety by reference). The DTS system comprises a DTS module 38 and a fiber-optic sensor 40 deployed within the well 10. The fiber-optic sensor 40 can be installed permanently or it can be installed temporarily using any means known in the art (e.g., via fiber-optic slickline, via permanent monitoring cabling, etc.). A flow metering device 42 is also included in the aspect of FIG. 2. The metering device 42 can be implemented using any conventional separator/meter apparatus that provides a measurement of the three phases at the surface of a commingled (oil, gas, water) fluid stream from several layers.

A process of the invention involves the selection and generation of a series of test flow rates within the well 10 using the AL system 20. As described below, an aspect of the invention entails the generation of fluid flow rates within the well 10 such that producing layers are added in steps until all desired zones are producing. This may be done in order of increasing flow rate starting from shut-in; however the order is not critical to the disclosed techniques. The number of flow rate test steps should be equal or greater to the number of layers being tested in order to resolve for all unknowns. In one aspect wherein the process is performed in order of increasing flow rate, the first stratum properties are measured directly at the surface using the flow metering device 42. As subsequent test steps include additional layers, surface measurement is of commingled rates and the previous layer properties are deducted in order to obtain the next contribution of the layer added at each step. The calculations are basic petroleum engineering calculations known in the art.

Turning to FIGS. 3A-3E, a series of plots are shown for a sample case study of a multi-rate test process of the invention conducted on a production well in accordance with the invention.

Figure 3A:
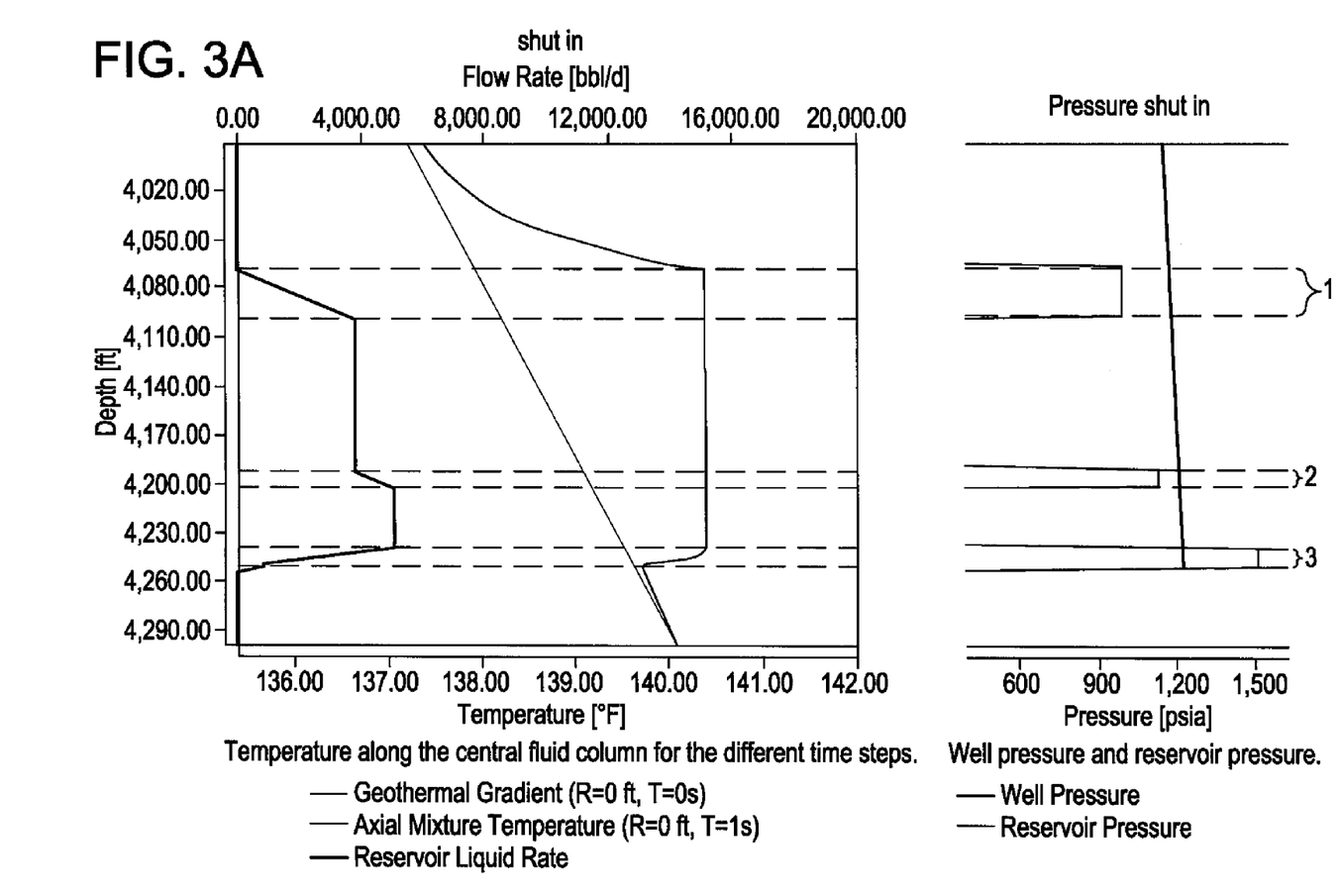
FIGS. 3A through 3E are plots of subsurface well pressure and temperature obtained in accord with aspects of the invention.

I. FIG. 3A shows the shut-in flow rates for three layers 1, 2, 3 at different depths in the formation. The flow rates can be determined using the DTS system 36 from the temperature profile as known in the art. The temperature profile is qualitative and shows that only layer is 3 is cross flowing into layer 1 and to surface as well. The right-hand plot in FIG. 3A shows the well pressure and reservoir pressure for the three layers 1, 2, 3. In one aspect, the pressure measurement is obtained using a pressure gauge 29 (See FIG. 2) mounted on the AL system 20. Other aspects may be implemented with a pressure gauge disposed on the casing or deployed within the well via other production tubing/cabling systems as known in the art. As shown in FIG. 3A, at shut-in, stratum 3 is cross-flowing into layers 1 and 2. At this point, no parameters can be determined as there is no flow to surface.

Figure 3B:
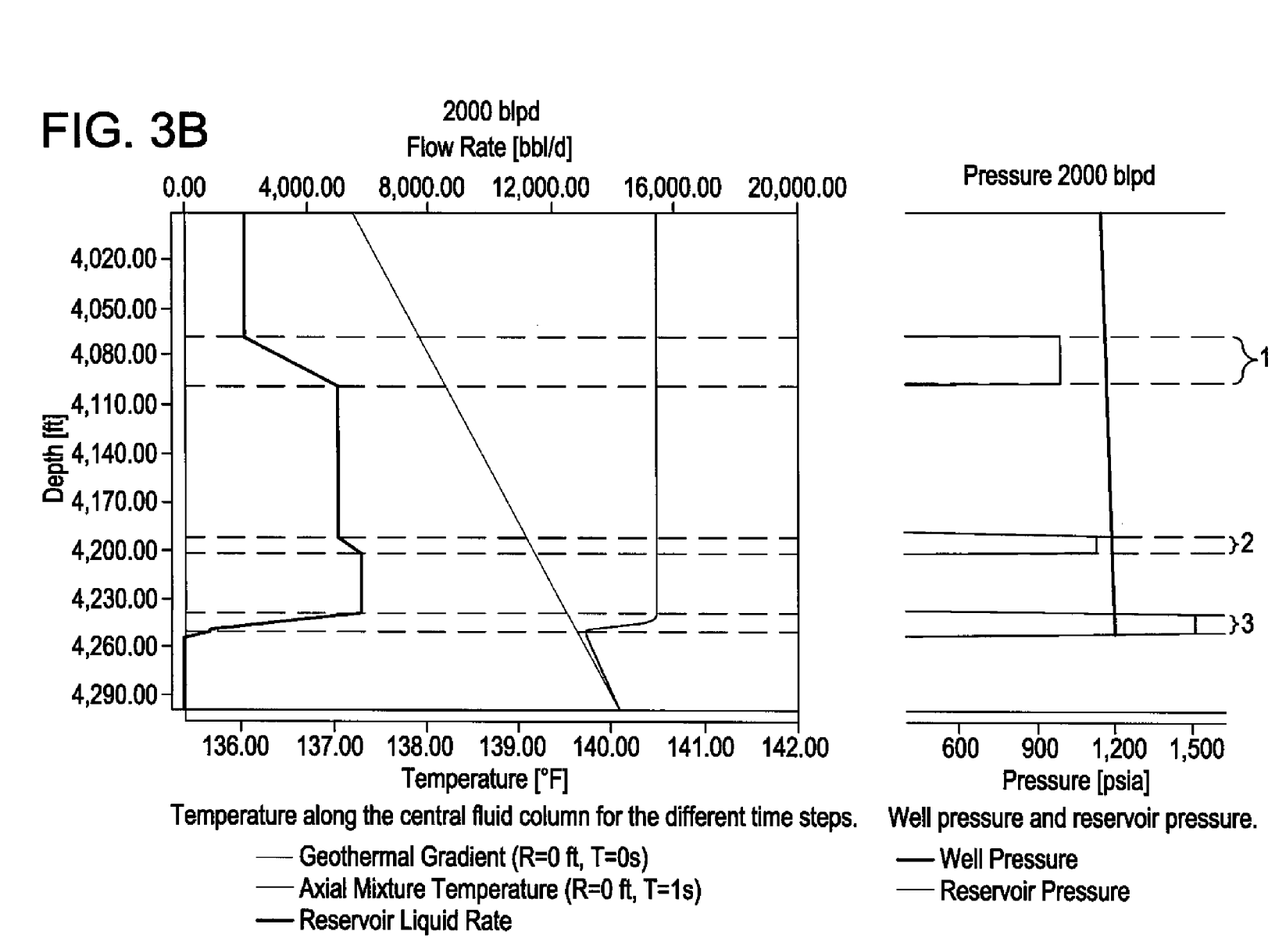

II. FIG. 3B shows plots similar to those of FIG. 3A for the same well, but with the flow rate altered to 2000 barrels of liquid per day (BLPD). At this rate, only stratum 3 is producing. The other two layers 1, 2 are taking fluid. The watercut of layer 3 is determined with the metering device 42.

Figure 3C:
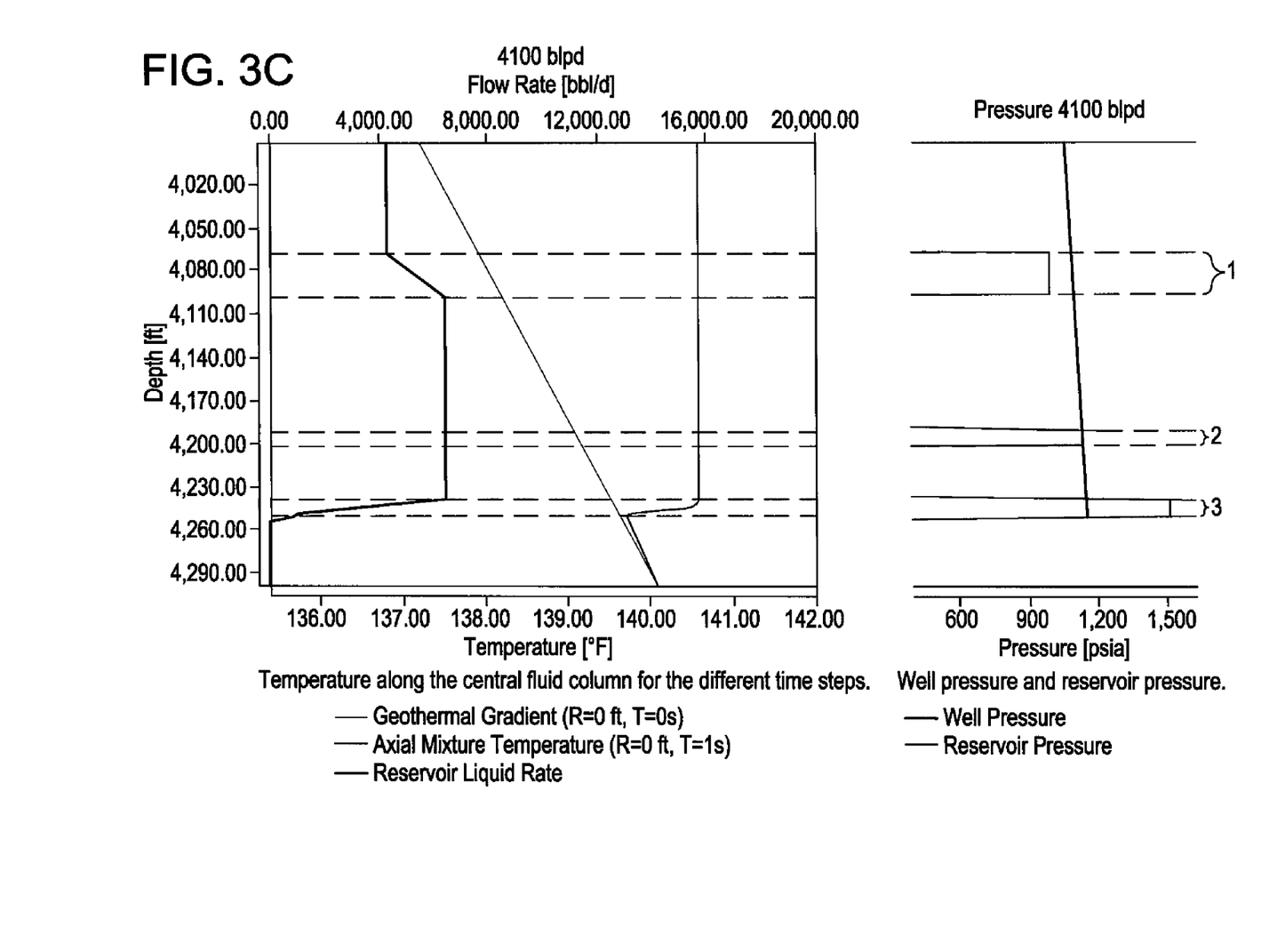
Figure 3D:
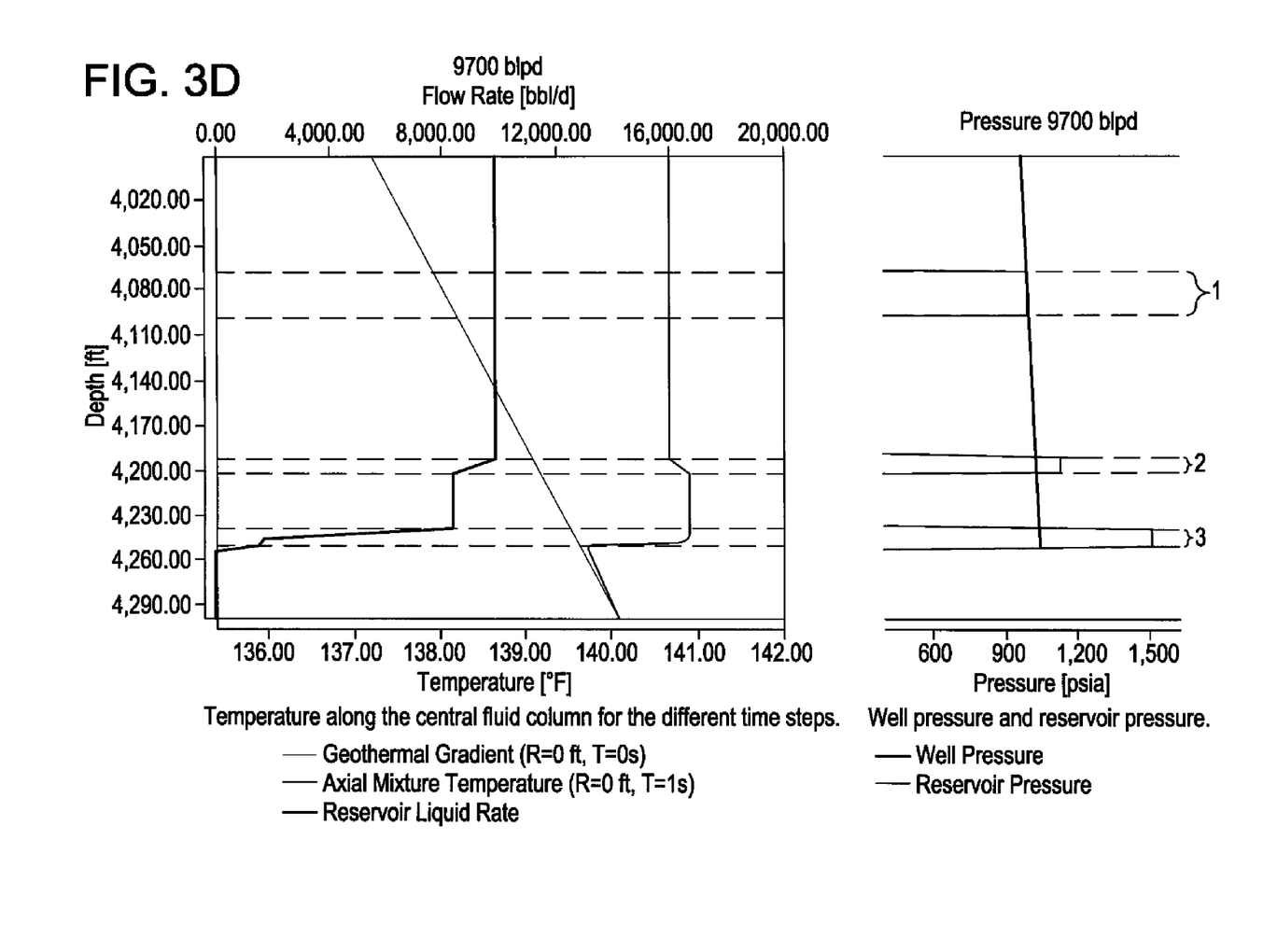

III. FIG. 3C shows the plots for the well at a rate of 4,100 BLPD. At this rate, stratum 2 is now at balance as there is no change in temperature in front of the layer, stratum 1 is taking fluid, and stratum 3 is the only one producing. The stratum 3 watercut is confirmed and the stratum 2 static pressure is now determined from the obtained data. Layer 3 static pressure can also be determined as two points on the layer 3 only IPR curve are now available from the steps shown in 3C and 3D.

IV. FIG. 3D shows the plots for the well at a rate of 9,700 BLPD. At this increased rate, stratum 1 is in balance as shown by the temperature plot, while 2 and 3 are producing, again as illustrated by the temperature plots.

i. Layer 2 watercut can now be determined by deducting the water produced from layer 3 determined in the previous steps, assuming a constant watercut, which is normal practice in most wells over a short period of time.
   ii. The stratum 1 static pressure is now also determined from the data as the layer is in balance conditions.

Figure 3E:
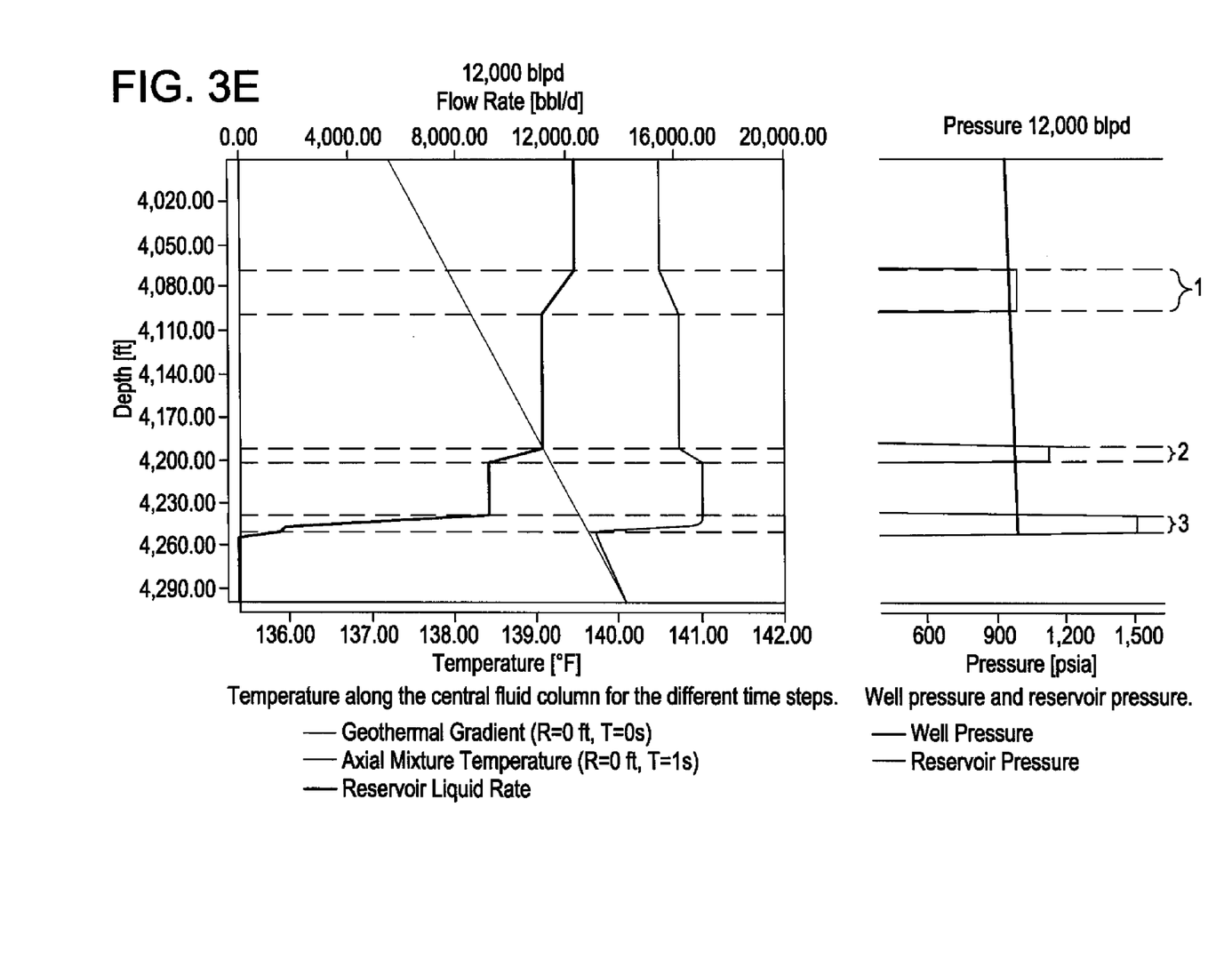

V. FIG. 3E shows the plots for the well at a rate of 12,000 BLPD. At this rate, all three layers 1, 2, 3 are contributing to the flow. Layer 1 watercut is obtained by deducting the watercuts of layers 2 and 3 obtained in the previous steps.

In this manner, desired measurements of the separate layer and reservoir parameters are obtained. The disclosed techniques can be applied in wells with more layers by applying additional test periods at other rates.

Another aspect of the invention entails the use of a conventional multiphase metering device 42 that has a high metrology quality (accuracy, resolution and repeatability) and provides continuous real time data on commingled flow rates of oil, water and gas. An example of an apparatus for measuring such flow rates is Schlumberger's PhaseTester™ VenturiX™ system (See, e.g., Ian Atkinson et al., *A New Horizon In Multiphase Flow Measurement*, OILFIELD REVIEW, Winter 2004/2005, at 52; and U.S. Pat. No. 7,240,568) which comprises a vertically mounted Venturi flow meter, a dual energy gamma-ray hold up measuring device and associated processors. This system successfully allows the simultaneous calculation of gas, water and oil volumetric flow rates in multiphase flows, and provides watercut measurements with high resolution and enables plotting of single phase oil only IPR curves.

Recording the downhole pressures at which changes occur in the flow profile during multi-rate testing allows for the generation of oil only inflow performance relationship (IPR) curves (as described in U.S. Pat. No. 4,442,710), which can be useful in the interpretation of results and to calibrate outflow multiphase models. The data can also be used to calibrate the selective inflow performance (SIP) method for calculating the productivity index (PI) and pressures for individual layers. In some cases, it is possible to identify points of inflexion (also referred to as slope changes) on the single phase oil only "pseudo IPR" curve (described below). This provides an additional calibration point for identifying the stratum pressure and the required test flow rates to isolate contributing layers. Though not required, the real-time continuous data provided by the multiphase metering device 42 enhances the techniques of the proposed invention as it ensures that measurements are taken with stabilized inflow conditions and that the test does not include measurements of transient effects caused by changes in drawdown or by a slugging well. This aspect is based on the fact that each layer has a different reservoir pressure and therefore will flow when layer pressure is greater than well pressure, which is most often the case in mature fields due to the fact that layers deplete at different speeds due to differences in permeability.

Figure 4A:
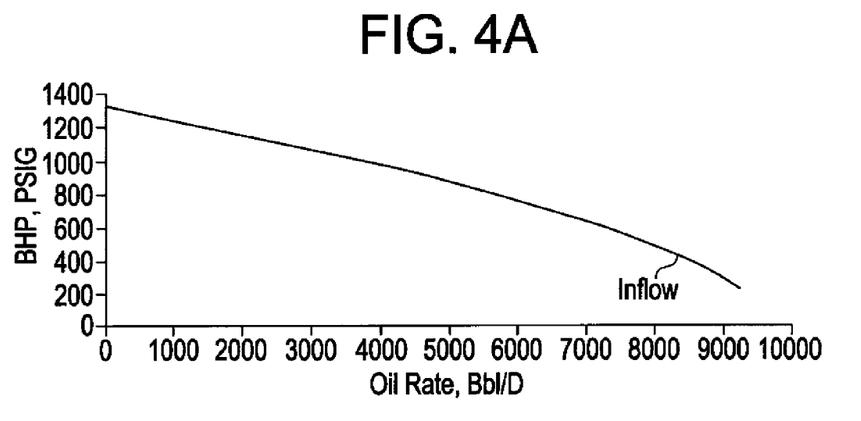
FIGS. 4A through 4C are single phase oil IPR curves in accord with aspects of the invention.
Figure 4B:
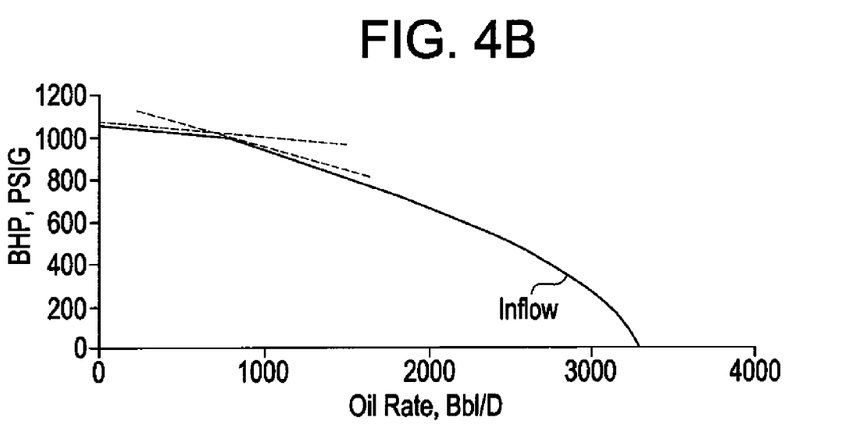
Figure 4C:
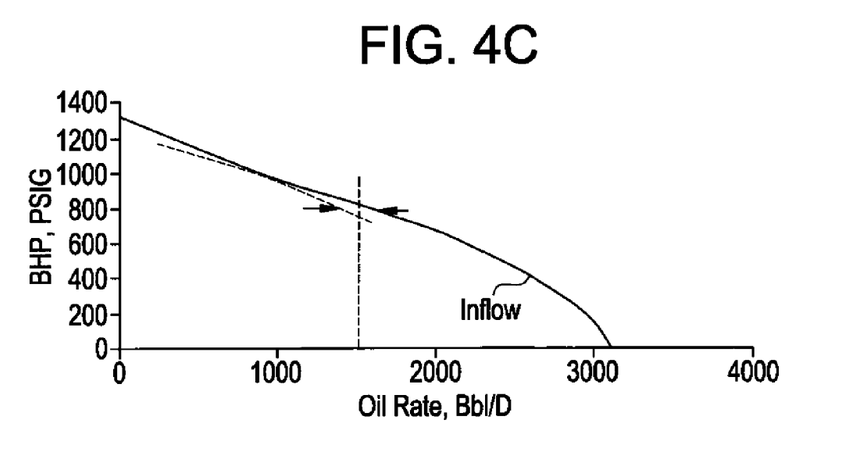

Turning to FIG. 4A, a single phase oil pseudo IPR curve is illustrated as measured with a multiphase metering device 42, and using bottom hole pressure measurements obtained with a pressure gauge 29. When layers have differing pressures and watercuts, they can exhibit a slope change on the single phase oil pseudo IPR curve. The case shown in FIG. 4A has no theoretical discernible slope change. FIGS. 4B and 4C illustrate IPR curves having a theoretical discernible slope change. The term "theoretical" is used as in practice, discernability will depend on the resolution required, which in turn depends on the relative pressures, PI, and watercut of the well layers. In this manner, one can use the flow measurement data for a layer by layer analysis.

Use of existing AL and DTS technology to implement the disclosed techniques provides several advantages. The invention not only provides essential reservoir data where no other method is available, it has the additional benefit of making use of the existing permanent production completion and therefore removes intervention cost. Layer pressures are measured directly, by observing the downhole pressure at which layers produce, stop producing, and inject. The DTS measurement provides a real-time and continuous temperature profile of the entire well, enabling an operator to simultaneously monitor downhole parameters, which is often not possible to achieve with time-consuming PLT surveys. Furthermore, the disclosed techniques can be performed remotely, saving the operator well intervention time and allowing immediate rectification of the issues observed.

Another advantage provided by the present invention is that the DTS data only needs to be sufficiently good to quantify either rate or watercut from any given stratum, and not both. This is possible as we have quantitative multiphase measurements made with the surface flow rate metering device 42 and pressure gauge 29 in the commingled fluid stream. This feature of the invention makes the methodology particularly robust as it is often difficult to measure multiphase flow rates accurately solely with DTS systems, although where this is possible, the technique is enhanced.

Figure 5:
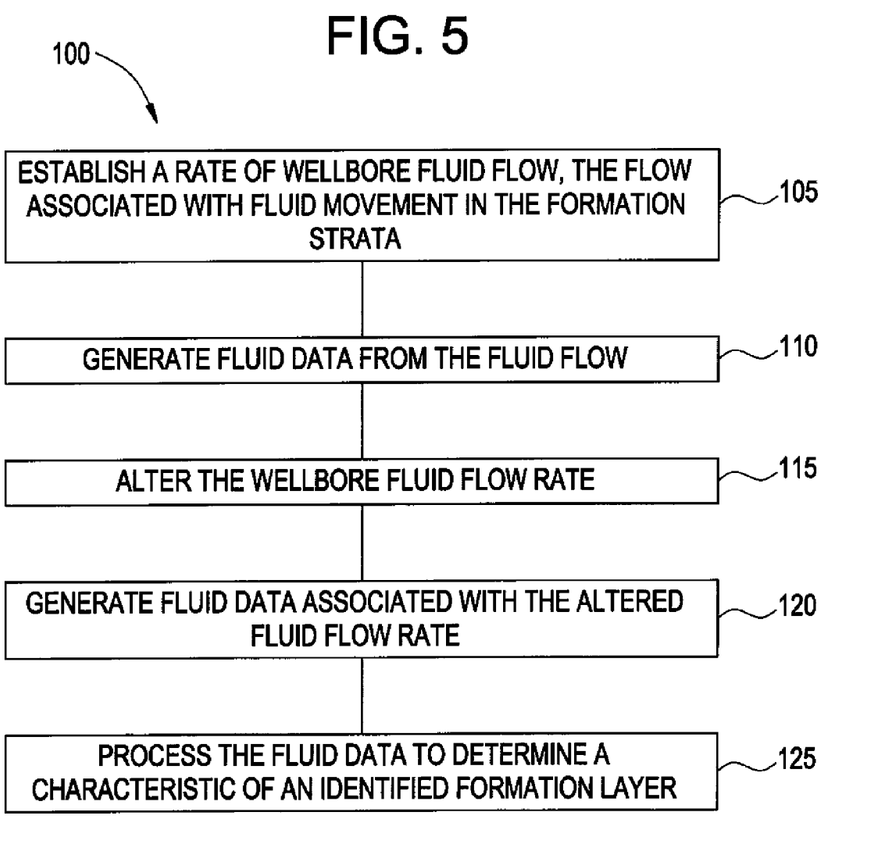
FIG. 5 is a flow chart of a method for determining subsurface formation characteristics in accord with aspects of the invention.

FIG. 5 shows a flow chart of a method for determining a characteristic of a subsurface formation traversed by a wellbore according to the invention. In one aspect, a method 100 entails establishing a rate of fluid flow in the wellbore, the flow being associated with fluid movement in one or more strata (such as layers 1, 2, 3 . . . n in FIG. 1) in the formation. The flow rate is established using an AL system 20 as described herein. Fluid data is generated from the fluid flow at step 105. The data comprises the parameter measurements (e.g., temperature, flow rate, fluid phases, watercut, and pressure) obtained with the DTS system 36, the pressure gauge 29 and the flow metering device 42. It will be appreciated by those skilled in the art that aspects of the invention can also comprise measurement data obtained with other instruments disposed in the well or obtained in previous well/reservoir operations (e.g., logging data obtained while drilling the wellbore). At step 110, the rate of fluid flow in the wellbore is altered using the AL system 20 as described herein. The multi-rate test steps are repeated to obtain the measurements and generate the data as described herein, at step 115. At step 120, the fluid data is processed to determine one or more of the characteristics separately pertaining to the identified stratum in the formation.

Figure 6:
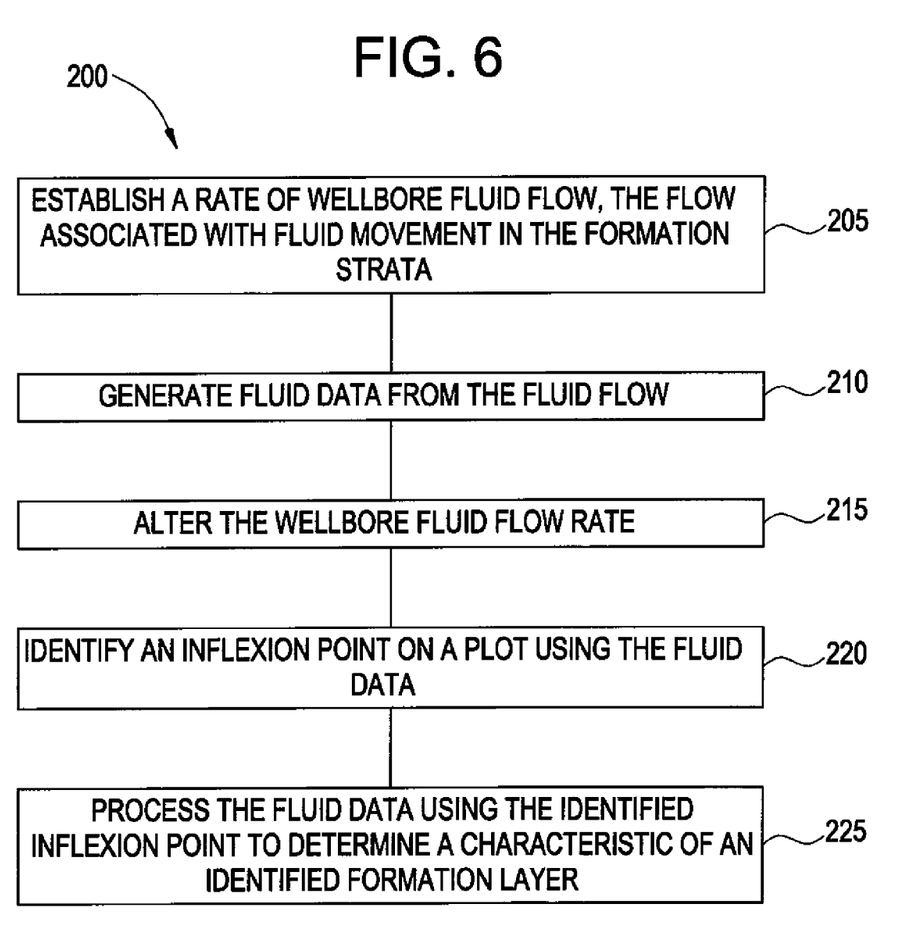
FIG. 6 is a flow chart of another method for determining subsurface formation characteristics in accord with aspects of the invention.

FIG. 6 shows a flow chart of another method for determining a characteristic of a subsurface formation traversed by a wellbore according to the invention. In one aspect, a method 200 entails establishing a rate of fluid flow in the wellbore, the flow being associated with fluid movement in one or more strata (such as layers 1, 2, 3 . . . n in FIG. 1) in the formation. The flow rate is established using an AL system 20 as described herein. Fluid data is generated from the fluid flow at step 205. The data comprises the parameter measurements (e.g., temperature, flow rate, fluid phases, watercut, and pressure) obtained with the DTS system 36, the pressure gauge 29 and the flow metering device 42. As previously noted, aspects of the invention can also comprise measurement data obtained with other instruments disposed in the well or obtained in previous welt/reservoir operations. At step 210, the rate of fluid flow in the wellbore is altered using the AL system 20 as described herein. An inflexion point is identified on a curve plot using the fluid data at step 215. At step 220, the fluid data is processed using the identified inflexion point to determine one or more of the characteristics pertaining to an identified stratum in the formation.

It will be apparent to those skilled in the art that this invention may be implemented using one or more suitable general-purpose computers having appropriate hardware and programmed to perform the techniques disclosed herein. The programming may be accomplished through the use of one or more program storage devices readable by the computer processor and encoding one or more programs of instructions executable by the computer for performing the operations described above. The program storage device may take the form of, e.g., one or more floppy disks; a CD ROM or other optical disk; a magnetic tape; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Thus these processing means may be implemented in the surface equipment (as represented by the surface computer in FIG. 2), in the AL system tool (as represented at 44 in FIG. 2), in a location remote from the well site (not shown), or shared by these means as known in the art.

While the present disclosure describes specific aspects of the invention, numerous modifications and variations will become apparent to those skilled in the art after studying the disclosure, including use of equivalent functional and/or structural substitutes for elements described herein. For example, it will be appreciated by one skilled in the art that the invention is not to be limited to implementations using any one specific sensor or instrument (i.e., conventional separators/flow meters, AL devices, pressure gauges, and DTS systems can be used in aspects of the invention). All such similar variations apparent to those skilled in the art are deemed to be within the scope of the invention as defined by the appended claims. For the purposes of this specification it will be clearly understood that the word "comprising" means "including but not limited to", and that the word "comprises" has a corresponding meaning.

What is claimed is:

1. A method for determining a characteristic of a subsurface formation traversed by a wellbore, comprising:

establishing a rate of fluid flow corresponding to each stratum of a plurality of strata in a formation;

generating fluid data from the fluid flow corresponding to each stratum;

altering the rate of fluid flow in the wellbore;

generating fluid data associated with the altered fluid flow rate; and processing the fluid data to determine at least one characteristic of each stratum in the plurality of strata.

2. The method of claim 1, wherein generating fluid data comprises determining fluid movement associated with one or more identified stratum in the formation.

3. The method of claim 2, wherein generating fluid data comprises establishing a temperature profile of the fluid in the wellbore.

4. The method of claim 3, wherein altering the rate of fluid flow in the wellbore comprises increasing or decreasing the flow to affect fluid movement in one or more stratum in the formation.

5. The method of claim 4, wherein processing the fluid data comprises determining a water component in the fluid associated with the identified formation stratum.

6. The method of claim 5, wherein processing the fluid data comprises determining fluid movement within the formation strata.

7. The method of claim 5, further comprising determining a pressure associated with an identified stratum in the formation.

8. The method of claim 5, wherein generating fluid data comprises obtaining a measurement of the fluid flow at the surface.

9. The method of claim 4, wherein generating fluid data comprises obtaining a multiphase measurement of the fluid flow to identify a change in an oil, gas, or water component in the fluid.

10. The method of claim 9, further comprising altering the rate of fluid flow in the wellbore based on the identified change in the oil, gas, or water component in the fluid.

11. A system to determine a characteristic of a subsurface formation traversed by a wellbore, comprising:

a sensor disposed in the wellbore to measure a temperature parameter to establish fluid data related to a rate of fluid flow in the wellbore, the flow associated with fluid movement in a plurality of strata in the formation;

a supplemental sensor to measure an additional a parameter of the fluid flow through the wellbore to generate fluid data;

an artificial lift system disposed in the wellbore to alter the rate of fluid flow in the wellbore; and a processor to process the generated fluid data to determine at least one characteristic of an identified stratum selected from the plurality of strata in the formation.

12. The system of claim 11, wherein the processor is configured to determine fluid movement within the formation strata.

13. The system of claim 11, wherein the sensor disposed in the wellbore comprises a fiber optic sensor.

14. The system of claim 11, wherein artificial lift system is operable to increase or decrease the flow to affect fluid movement in one or more stratum in the formation.

15. The system of claim 11, wherein the sensor to measure a parameter of the fluid flow is configured to detect a water component in the flow.

16. The system of claim 11, wherein the supplemental sensor is disposed in the wellbore to measure a pressure associated with an identified stratum in the formation.

17. The system of claim 15, wherein the sensor to measure a parameter of the fluid flow is configured to obtain a multiphase measurement of the fluid to identify a change in an oil, gas, or water component in the fluid.

18. A method for determining a characteristic of a subsurface formation traversed by a wellbore, comprising:
- establishing a rate of fluid flow corresponding to each stratum of a plurality of strata in a formation;
- generating fluid data from the fluid flow corresponding to each stratum;
- altering the rate of fluid flow in the wellbore;
- identifying an inflexion point on a plot using the fluid data; and
- processing the fluid data using the identified inflexion point to determine at least one characteristic of an identified stratum in the formation.

19. The method of claim 18, further comprising using the identified inflexion point to determine a stabilized fluid flow condition in the wellbore.

20. The method of claim 18, wherein the plot comprises data representative of a single phase component in the fluid flow.

* * * * *